(12) United States Patent
Hornback

(10) Patent No.: US 11,465,080 B1
(45) Date of Patent: Oct. 11, 2022

(54) WASTEWATER TREATMENT SYSTEM OUTLET FILTER CLEANER

(71) Applicant: WATERCORE LLC, Shepherdsville, KY (US)

(72) Inventor: Michael Hornback, Morgantown, KY (US)

(73) Assignee: Watercore LLC, Shepherdsville, KY (US)

( * ) Notice: Subject to any disclaimer, the term of this patent is extended or adjusted under 35 U.S.C. 154(b) by 0 days.

(21) Appl. No.: 16/414,343

(22) Filed: May 16, 2019

Related U.S. Application Data

(60) Provisional application No. 62/690,467, filed on Jun. 27, 2018, provisional application No. 62/679,380, filed on Jun. 1, 2018.

(51) Int. Cl.
| | | |
|---|---|---|
| *B01D 35/027* | (2006.01) |
| *B01D 29/35* | (2006.01) |
| *B01D 21/24* | (2006.01) |
| *B01D 21/00* | (2006.01) |
| *B01D 21/02* | (2006.01) |
| *B01D 29/68* | (2006.01) |
| *B01D 29/66* | (2006.01) |
| *B01D 29/64* | (2006.01) |
| *B01D 29/11* | (2006.01) |

(52) U.S. Cl.
CPC ..... *B01D 35/0276* (2013.01); *B01D 21/0006* (2013.01); *B01D 21/0012* (2013.01); *B01D 21/02* (2013.01); *B01D 21/2444* (2013.01); *B01D 29/111* (2013.01); *B01D 29/35* (2013.01); *B01D 29/6423* (2013.01); *B01D 29/6484* (2013.01); *B01D 29/66* (2013.01); *B01D 29/684* (2013.01); *B01D 2201/081* (2013.01); *B01D 2201/184* (2013.01); *B01D 2201/287* (2013.01); *B01D 2201/34* (2013.01)

(58) Field of Classification Search
CPC .......................... B01D 29/64; B01D 29/6423; B01D 29/6453; B01D 29/6484; B01D 29/66; B01D 29/684; B01D 2201/08; B01D 2201/081; B01D 29/445
See application file for complete search history.

(56) References Cited

U.S. PATENT DOCUMENTS

| | | | | |
|---|---|---|---|---|
| 1,803,477 A | * | 5/1931 | Kullander | ............ B01D 29/356 |
| | | | | 210/357 |
| 1,877,157 A | * | 9/1932 | Cannon | .............. B01D 29/6461 |
| | | | | 210/409 |

(Continued)

OTHER PUBLICATIONS youtube.com; SaniTEE Screening (septic tank effluent filter) Device; published Jul. 24, 2009; URL: https://www.youtube.com/watch?v=BoDK0jpyfdc.

*Primary Examiner* — Benjamin M Kurtz
(74) *Attorney, Agent, or Firm* — Middleton Reutlinger

(57) ABSTRACT

The present development is a septic tank or wastewater treatment tank outlet filter cleaning device. More specifically, the device is an outlet filter cleaner for a slotted filter used to reduce solid waste transfer into a septic tank effluent. The device comprises a central shaft with at least one cleaning disc, wherein the cleaning disc comprises a body which is mounted on the shaft and wherein a plurality of fingers protrude from the body, preferably in locations substantially identical to the positions of the openings in the wall of the tube.

21 Claims, 15 Drawing Sheets

(56) References Cited

U.S. PATENT DOCUMENTS

| | | | |
|---|---|---|---|
| 2,889,048 A * | 6/1959 | Nordin | B01D 29/6453 210/409 |
| 2,900,084 A | 8/1959 | Zabel | |
| 3,794,179 A * | 2/1974 | Doucet | B01D 29/904 210/409 |
| 4,426,293 A | 1/1984 | Mason et al. | |
| 4,710,295 A | 12/1987 | Zabel | |
| 5,156,742 A | 10/1992 | Struewing | |
| 5,382,357 A | 1/1995 | Nurse | |
| 5,482,621 A * | 1/1996 | Nurse | B01D 21/0006 210/170.08 |
| 5,492,635 A | 2/1996 | Ball | |
| 5,569,387 A | 10/1996 | Bowne et al. | |
| 5,582,716 A | 12/1996 | Nurse, Jr. | |
| 5,770,081 A | 6/1998 | McKinney | |
| 6,129,837 A | 10/2000 | Nurse, Jr. | |
| 6,187,183 B1 | 2/2001 | Weaver et al. | |
| 6,224,041 B1 | 5/2001 | Rebori et al. | |
| 6,395,171 B1 * | 5/2002 | Carlsson | B01D 29/6484 210/251 |
| 6,554,996 B1 | 4/2003 | Rebori | |
| 7,225,587 B2 | 6/2007 | Shinehouse et al. | |
| 7,818,094 B2 | 10/2010 | Rambicourt et al. | |
| 8,469,625 B2 | 6/2013 | White | |
| 8,834,061 B2 | 9/2014 | White | |
| 9,233,323 B1 | 1/2016 | Gavin | |
| 9,931,590 B2 | 4/2018 | Gavin | |
| 2016/0258136 A1 | 9/2016 | Coelho Nunes et al. | |

* cited by examiner

WASTEWATER TREATMENT SYSTEM OUTLET FILTER CLEANER

CLAIM TO PRIORITY

This non-provisional patent application claims priority to and benefit of, under 35 U.S.C. § 119(e), U.S. Provisional Patent Application Ser. No. 62/679,380, filed Jun. 1, 2018 and titled "Wastewater Treatment System Outlet Filter Cleaner", and U.S. Provisional Patent Application Ser. No. 62/690,467, filed Jun. 27, 2018 and titled "Riser Lid for Wastewater Treatment Systems", all of which is incorporated by reference herein.

BACKGROUND

Present embodiments pertain to wastewater treatment systems. More specifically, present embodiments pertain to a riser cover and an outlet filter cleaner accessible through the riser cover for wastewater treatment systems.

In a conventionally operated septic tank, raw sewage wastewater having a significant concentration of waste solids enters one end of the tank, and then the solids are separated from the liquid portion of the sewage—with solids having a lower density than the liquid moving to the top of the liquid to form a scum layer and the solids having a higher density than the liquid sinking to the bottom of the tank to form a sludge layer. Between the scum layer and the sludge layer is a liquid layer from which wastewater is drawn and discharged from the tank as the septic tank effluent.

Before the effluent is discharged, many states require that the wastewater passes through an outlet filter to remove additional solid material. An early example of an outlet filter is described in U.S. Pat. No. 2,900,084, which is incorporated herein by reference. The '084 outlet filter comprises a tubular housing, an overflow dam, and a canopy. The overflow dam includes an overflow wall that has a plurality of accordion-like folds which help trap solid materials before they exit from the outlet filter. To further improve solids removal, multiple filtering discs or disc-dams were added to the outlet filter, as taught in U.S. Pat. Nos. 4,710,295 and 5,582,716, both of which are incorporated herein in their entireties by reference. While the disc-dam outlet filters do improve solids removal, the design of the disc-dams can allow solids to be trapped within the accordion-like folds which can be difficult to clean.

Alternative versions of outlet filters are described in U.S. Pat. Nos. 5,382,357 and 5,770,081, both of which are incorporated herein in their entireties by reference. These devices include a tubular filter element with a series of slots of predetermined size extending through the tubular element. By making the slots relatively small in size, larger pieces of solid materials are prevented from entering the discharge region of the septic system and being discharged with the effluent. However, similar to the disc-dam outlet filters, over time the slots do accumulate waste and require cleaning.

In a different variation, columnar filters have been used in combination with perforated filter chambers to further improve solids removal. Examples of this type of filtering system are taught in U.S. Pat. Nos. 5,492,635 and 6,372,237, both of which are incorporated herein in their entireties by reference. The columnar filters are less taxed for solids removal than the filtering discs or the filtering slots because larger solids are prevented from reaching the columnar filters by the perforated chamber, but debris does build up on the filters over time creating clogging and requiring cleaning.

The cleaning process frequently involves removing the entire outlet filter canister from the fluid piping or chamber system in which it is installed. Through ground settling and other environmental conditions, the outlet filter may shift slightly within the septic tank thereby requiring some manipulation of the clogged canister during removal or replacement. Any manipulation tends to disturb some of the material extracted by the filter, making the whole process somewhat disagreeable.

Consequently, there exists a need in the art for an apparatus that is capable of cleaning the filtering components of the outlet filter, or dislodging solids trapped within the slots or the filtering dams, without requiring the complete removal of the outlet filter from the septic tank.

Further, in order to clean a filter, typical waste tanks have a cover at ground level. In order to service the septic tank, including to clean the outlet filter, the cover must be completely removed from the riser. This leaves a relatively large opening that can create a hazard for small children or animals. Consequently, there exists a need in the art for a septic tank cover that provides access to allow for cleaning the filtering components of the outlet filter without requiring the complete removal of the cover from the septic tank.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments provide a septic tank or wastewater treatment tank outlet filter cleaning device. The device may be used to clean the orifices in a slotted filter used to reduce solid waste transfer into a septic tank effluent or it may be used to clean outlet filter discs or a columnar filter array or any combination thereof. The outlet filter cleaner of the present embodiments comprise a shaft, for non-limiting example a central shaft, with at least one cleaning disc. In a first embodiment, the central shaft is hollow and perforated to allow air or water to feed into the shaft and through perforations thereby providing a means to dislodge debris from within filter discs or adhered to columnar filters. The cleaning disc comprises a frame which is mounted on the shaft and a plurality of fingers that protrude from the frame away from the shaft and reaching for the slotted filter. In a first alternative embodiment, the fingers are designed to be long enough to fit through the slots of the slotted filter so when the central shaft is raised and lowered the fingers engage the edges of the filter slots and dislodge debris from the slots.

In at least one embodiment, the outlet filter cleaner has an adequate number of cleaning discs to provide at least one finger per slot in the filter. In some embodiments, the fingers are oriented in locations substantially identical to the positions of the slots in the filter.

In some embodiments, an outlet filter cleaner may comprise a filter having a plurality of filtration slats and defining a plurality of spacings, a disc disposed in the filter, a central shaft connected to the disc, the disc being movable with the shaft through the filter. A plurality of fingers of predetermined length extending from the disc and extending into the spacings.

According to some optional embodiments, the plurality of fingers may be movable through the spacings with movement of the disc through the filter. The shaft may have a handle at an upper end and a plurality of openings therein for movement of fluid. The outlet filter cleaner may further comprise a coupling at an upper end of the shaft to provide a connection with a fluid supply, wherein there is movement of a fluid supply through the filter. The outlet filter cleaner may further comprise a second disc on the shaft, wherein the movable disc moves vertically, rotates, or a combination of both. The outlet filter cleaner may further comprise a filter housing pipe having an outlet pipe, the filter being disposed in the filter housing pipe. The outlet filter cleaner having spacings that may be horizontal, vertical, or, spiral.

According to some embodiments, an outlet filter cleaner may comprise a filter housing pipe having an inlet and an outlet, wherein waste fluid moves into the inlet and out through the outlet. A filter may be disposed within the filter housing pipe, said filter having a plurality of slats defining spaces therebetween. A shaft may be disposed in the filter and may have at least one disc connected to the shaft, the disc having a plurality of fingers extending through the spaces. The shaft may be movable within the filter to move the disc relative to the filter and move the fingers through the openings to clean the filter. The filter may be closely spaced relative to the filter housing pipe.

The outlet filter cleaner further comprising a handle on the shaft, wherein the shaft moves vertically, rotates, or a combination of both. The outlet filter cleaner further comprising a coupling for connection of a fluid conduit, wherein a fluid is capable of moving through the filter. The outlet filter cleaner having spacings that may be horizontal, vertical, or spiral.

Further, embodiments may comprise an outlet filter cleaner, comprising a filter having a plurality of filtration slats which define a plurality of spacings, a disc being disposed adjacent to the filter, a shaft connected to the disc, the disc being movable with the shaft relative to the filter. A plurality of fingers of predetermined length may extend from the disc and extend into the spacings, the plurality of fingers being movable through the spaces with movement of the disc relative to the filter, the disc being disposed within the filter, and the fingers extending outwardly.

The outlet filter cleaner may further comprise fluid apertures for directing a fluid toward the filter. In some embodiments, the disc may be disposed outside the filter, wherein the fingers may extend inwardly and fluid apertures may direct a fluid toward the filter.

According to some embodiments, a method of cleaning a filter for a septic system comprise providing a filter housing pipe within a septic tank, providing a filter having a plurality of slats defining a plurality of spaces within the filter housing pipe, moving a disc through the filter, and moving a plurality of fingers extending into and through the spaces.

Optionally, the method may further comprise forcing a fluid through a shaft connected to the disc to clean the vertical openings and further comprising moving water from an inside to an outside of the filter. The method further comprising moving water from an outside to an inside of the filter.

According to some embodiments, a waste water treatment system riser cover, comprises a plate defining a top surface and a bottom surface wherein the plate has an aperture extending from the top surface to the bottom surface and further comprises a flap mounted on the top surface of the plate so as to completely cover the aperture when the flap is in a closed position.

The riser cover wherein the flap is one of affixed to the plate with a hinge or removably connected to the plate and is threadably connected to the plate.

The riser cover wherein the aperture is either substantially centered on the plate or may be positioned away from the center of the plate. The aperture may have a maximum area of 30 square inches. The flap may be formed of two or more overlapping structures which cover the apertures. The riser cover may further comprise a plurality of strengthening ribs on the plate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present embodiments are provided in the following written description, illustrated in the accompanying drawings, and defined in the appended claims.

BRIEF DESCRIPTION OF THE DRAWINGS

In order that the embodiments may be better understood, embodiments of a wastewater treatment system outlet filter cleaner will now be described by way of examples. These embodiments are not to limit the scope of the claims as other embodiments of the wastewater treatment system outlet filter cleaner will become apparent to one having ordinary skill in the art upon reading the instant description. Non-limiting examples of the present embodiments are shown in figures wherein:

FIG. 11 is a perspective view of an outlet filter cleaner which cleans a filter from outside in;

DETAILED DESCRIPTION

Figure 1:
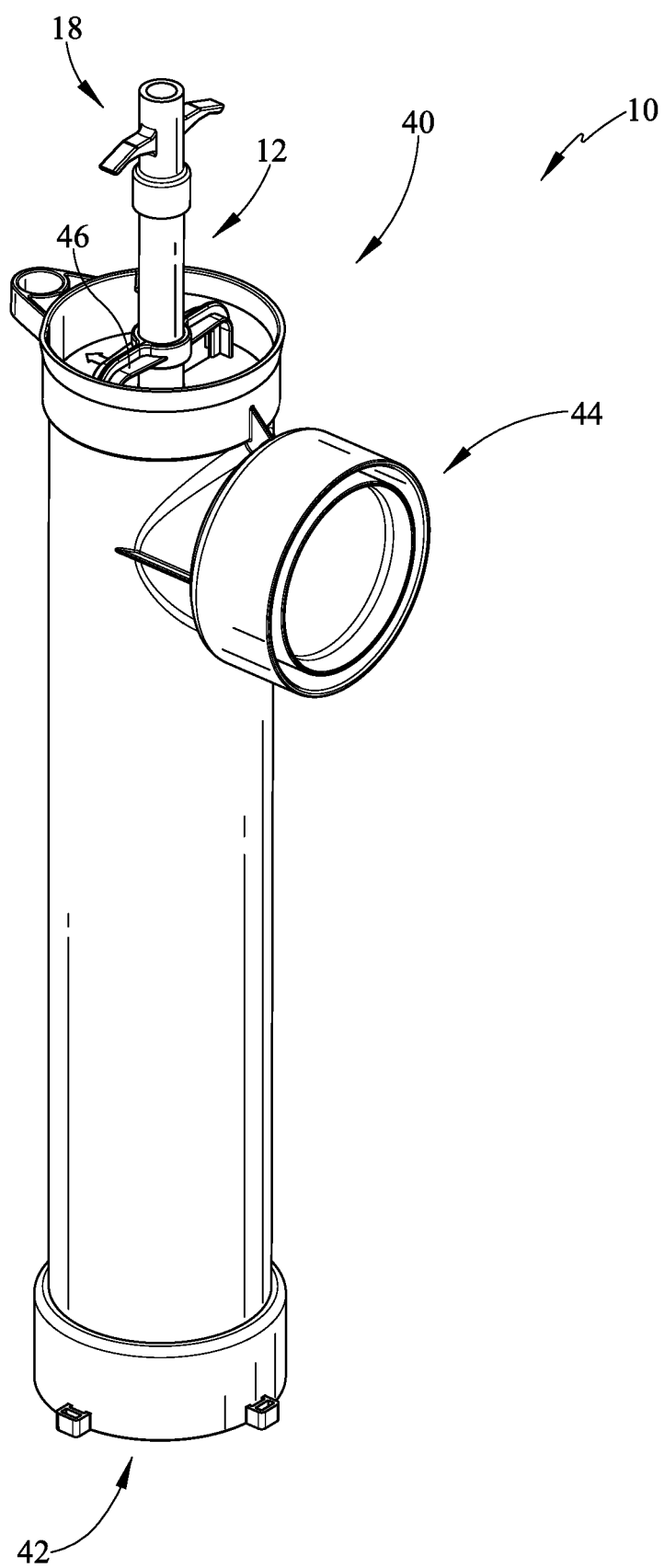
FIG. 1 is a perspective view of an outlet filter cleaner including filter housing pipe.

The following description is intended to provide the reader with a better understanding of the instant examples. The description is not intended to be limiting with respect to any element not otherwise limited within the claims. For example, the present examples will be described in the context of use with a commonly known outlet filter system for a septic tank, but the teachings herein are not limited to septic tank usage. It is anticipated that the present development may be used in any application wherein a tubular structure that is open at at least one end has orifices that require cleaning.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

The outlet filter cleaner of the present embodiments are intended to be used to dislodge solid materials from an outlet filter of a wastewater treatment system or septic tank. Specifically, the outlet filter cleaner is intended to be used to dislodge solid materials from outlet filters designed to filter out or prevent larger-sized solid materials from entering a discharge port from the septic tank, such as but not limited to tubular filter elements having orifices or slots or holes or perforations, or outlet filter discs or dam-discs, or columnar filters or columnar filter arrays, or combinations thereof. Hereinafter, the term "tubular filter element" is used to refer to any structure comprising a hollow core and a generally rigid wall surrounding the hollow core regardless of cross-sectional shape of the core, e.g. the tubular filter element may be cylindrical or square or star-shaped or wavy or any shape that is used for wastewater treatment system outlet filters, and will be used to encompass prior art tubular filter elements, housings for filter discs or disc-dam filters, housings for columnar filter arrays, or any housing or chamber or container or structure used in water treatment outlet filters. Hereinafter, the term "slots" is used to generically describe any aperture, hole, slit, cut, or other form of perforation that creates a void space within the tubular filter element.

Referring to FIGS. 1-17, an outlet filter cleaner is shown and described. The outlet filter cleaner 10 is utilized in a septic waste tank such that the wastewater or waste material, including liquid scum and/or sludge, is filtered to form liquid effluent before passing through an outlet of the filter housing pipe into a filtered side of the tank. The outlet filter cleaner 10 comprises a filter housing pipe 40, wherein the filter is cleaned. The filter housing pipe 40 includes an inlet 42 and an outlet 44. The filter housing pipe 40 is shown as an L-shape in the instant embodiment although other shapes may be utilized. In the depicted structure, the wastewater enters through the bottom of the filter housing pipe 40 and rises to a level at which the outlet 44 is located. The top of the pipe may be closed to inhibit by-passing of the outlet 44. The wastewater must move through a filter located within the filter housing pipe 40 in order to exit the outlet 44. The filter housing pipe 40 is shown as having a circular cross section at both the inlet 42 and the outlet 44. However, other cross sectional shapes may be utilized so that a filter may be placed within the hollowed filter housing pipe 40 and generally sealed forcing the unfiltered wastewater to move through the filter before passing through the outlet 44. The upper end of the filter housing pipe 40 comprises a shaft 12 in some examples which may be a central shaft, and which is further shown with a handle 18 located at the upper end. The shaft 12 may extend through a guide 46, located at the upper end of the filter housing pipe 40 so that the shaft 12 is guided relative to the hollow interior of the filter housing pipe 40 for movement vertically through the pipe housing 40. The handle 18 at the upper end of the shaft 12 may be utilized to move a cleaning structure relative to the interior of the filter housing pipe 40 and more specifically, relative to a filter therein.

Figure 2:
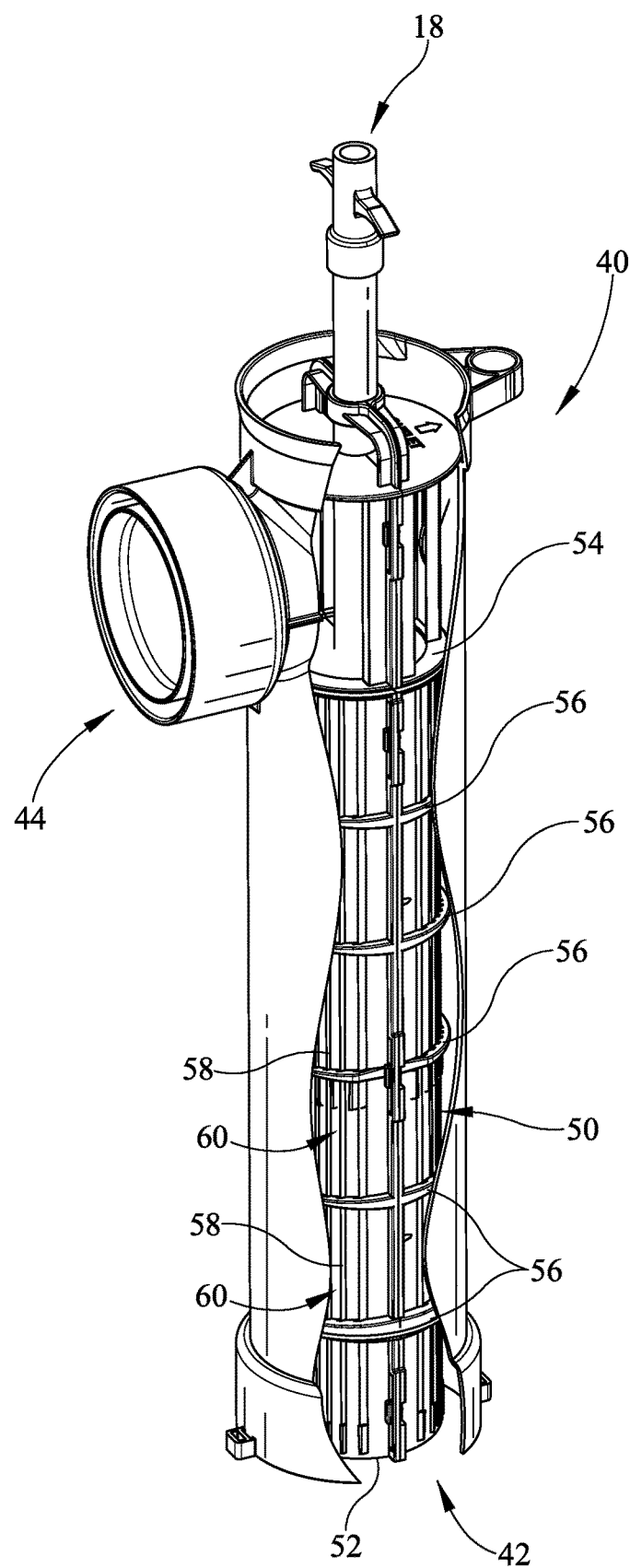
FIG. 2 is a perspective view of the outlet filter housing of FIG. 1 with a portion removed to reveal the filter therein.

Referring now to FIG. 2, the filter housing pipe 40 of the outlet filter cleaner 10 is shown in perspective view with a portion of the filter housing pipe 40 removed, to reveal the filter structure therein. The filter housing pipe 40 is hollow as previously described so that a filter 50 may be disposed therein. Wastewater is filtered and moves along the exterior of the filter, along the housing pipe 40 inner surface, to the outlet 44.

The housing 40 may be a one-piece or multi-piece structure. Likewise, the filter 50 may also be a one-piece or multi-piece structure. In the depicted example, the housing 40 is a one-piece structure and the filter 50 is a multi-piece structure that is clasped together along seams of two semi-circular halves. Other arrangements are possible for either the housing 40 or the filter 50. As depicted, the unfiltered wastewater moves upwardly through the inlet 42 of the filter housing pipe 40 and passes through the filter 50 from a radially inward location of the filter 50 to a location radially outward of the filter 50 such that the effluent or filtered wastewater may then exit at the outlet 44. The filter 50 is sealed relative to an inner surface of the filter housing pipe 40 near the inlet 42 end of the filter housing pipe 40. This inhibits unfiltered wastewater from moving upwardly along the outside of the filter and gaining access to the outlet 44. Instead, the unfiltered wastewater must move through the interior of the filter 50 and then move radially outwardly to the inside of the filter housing pipe 40.

As shown in the depicted embodiment, the filter 50 is generally vertically oriented and is circular in cross-section to approximate the shape of the interior of the filter housing pipe 40. The filter 50 has a lower end 52 and an upper end 54 with a plurality of strengthening ribs 56 spaced apart axially between the lower end 52 and the upper end 54.

The filter 50 further comprises a plurality of vertical slats 58 extending between the ribs 56. The vertical slats 58 provide a space or slot 60 between each slat 58 so that the unfiltered water is filtered as it moves from the inside of the filter 50 to the outside of the filter 50 so as to access the outlet 44. The spacing dimensions between each slat 58 may be dependent on the level of filtration need and the particle sizes being filtered.

As one skilled in the art can understand, over the course of time performing such filtering, the spaces 60 become fouled or plugged with waste material and require cleaning. Prior art filters typically require removal from the septic tank in order to perform such cleaning. The instant embodiment provide the outlet filter cleaner 10 with one or more structures 20, 30, 120, 220 which are moveable along the inside of the filter 50 or the outside of the filter 50 depending on the construction, in order to clean the spaces 60 between the slats 58 and unplug the filter 50. Whereas prior art filter cleaning requires removal of the filter, the instant cleaning may occur in situ. Such cleaning occurs by a user grasping handle 18 and moving the shaft 12 up and down relative to the filter 50 in order to unplug the spaces 60 between the slats 58.

Figure 3:
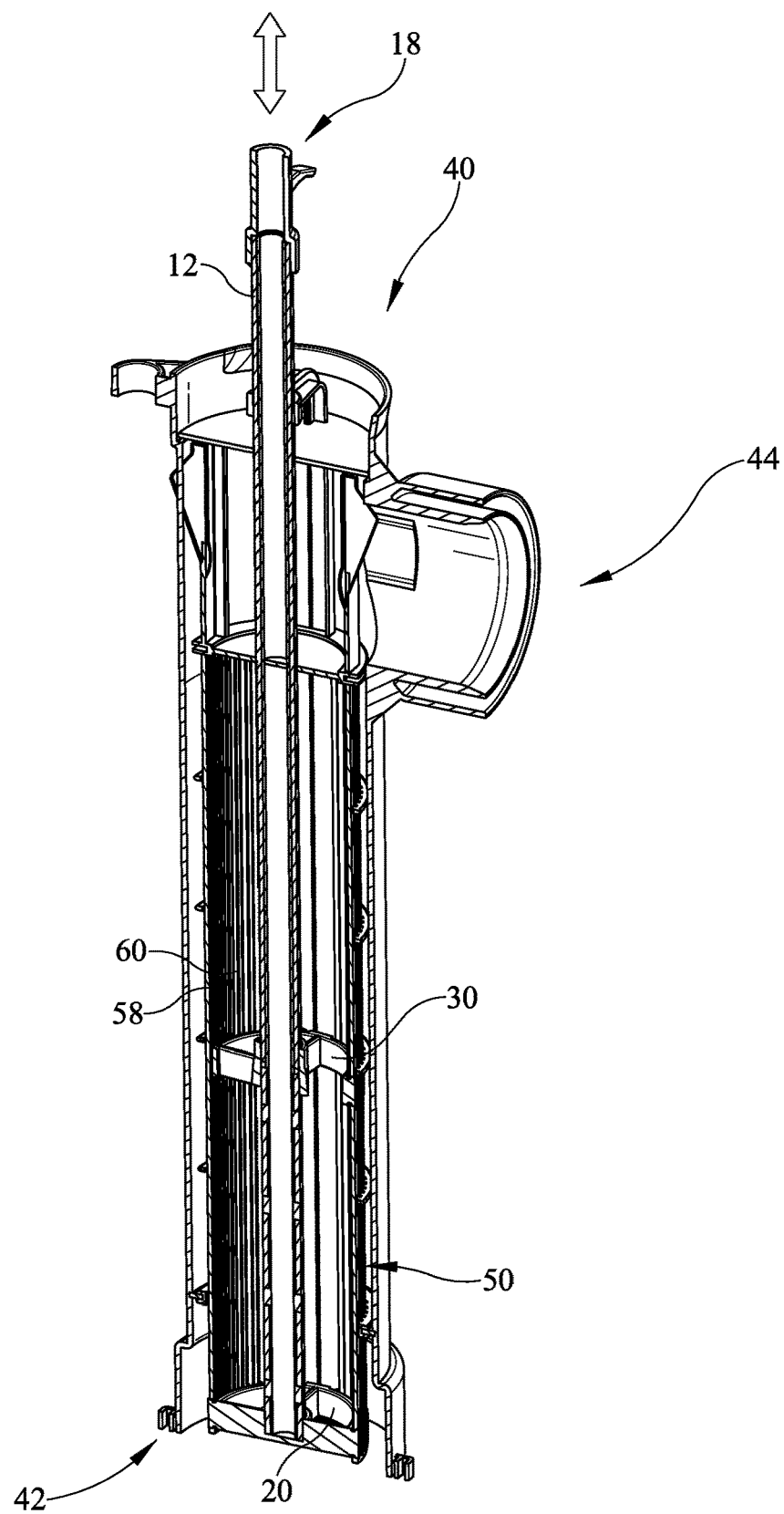
FIG. 3 is a sectioned perspective view of an example of the outlet filter cleaner.

Referring now to FIG. 3, a section view of the outlet filter cleaner 10 is depicted. The section is taken vertically through the outlet filter pipe housing 40 and the filter 50 therein to reveal the shaft 12 extending axially through the filter housing pipe 40. Within the filter housing pipe 40 and inside of the filter 50, the shaft 12 extends having the handle 18 at the upper end 44. The shaft 12 extends to the lower end of the filter housing pipe 40 where the inlet 42 is shown.

In this view, the movement of the shaft 12 reveals the movement of the cleaning structures, or discs 20, 30, through the filter 50. The filter 50 may also be sealed relative to the inner surface of the housing pipe 40 so that wastewater is forced upward through the interior of the filter 50. While the term disc is used, it should not be construed as limiting the shape of the structure as various shapes, circular and others, may be utilized which function with the filter and housing.

Figure 4:
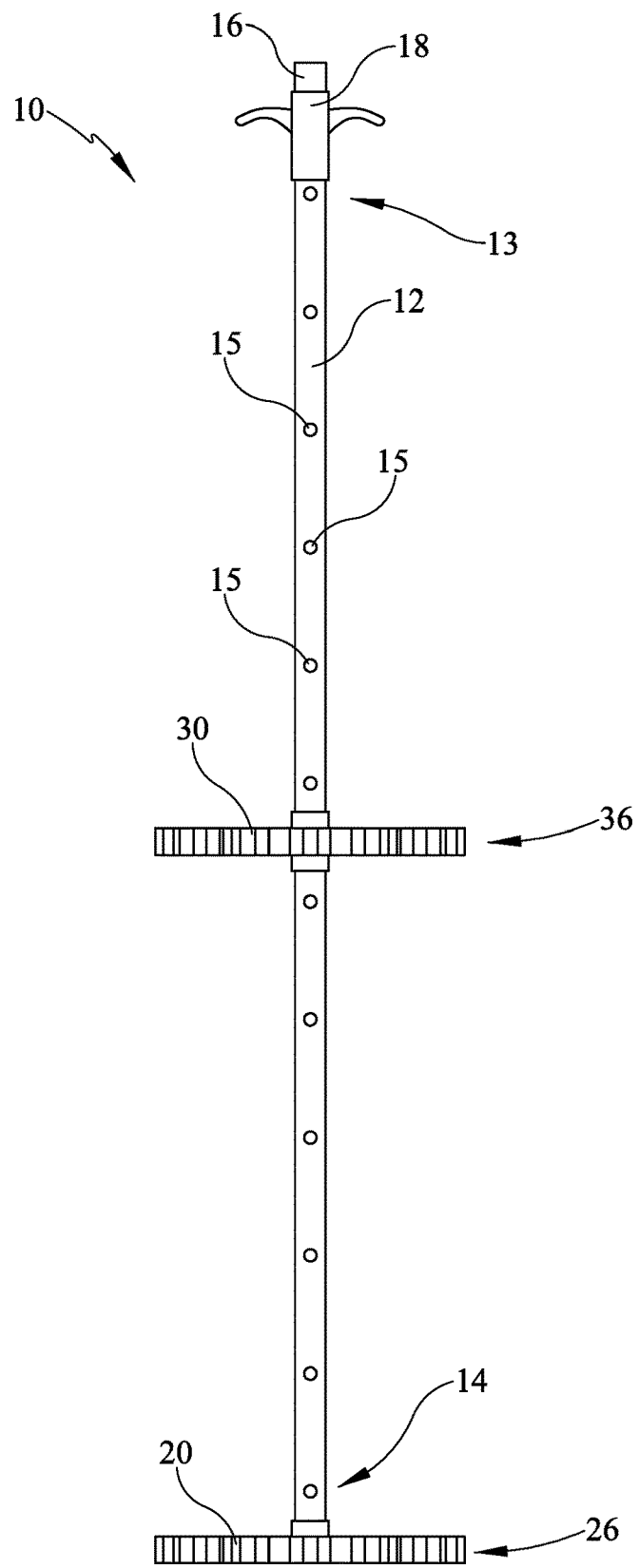
FIG. 4 is a side view of an example of the outlet filter cleaner.

As shown in FIG. 4, the shaft 12 defines a proximal end 13 and a distal end 14. The shaft 12 may have a solid core or a hollow core, and may be sufficiently strong to retain a straight shape when the shaft is moved during the outlet filter cleaning process. In a first embodiment, the shaft 12 has a solid core and an end cleaning disc 20 is affixed to the distal end 14 of the shaft 12. In a second embodiment, the shaft 12 has a hollow core, a solutions inlet connector 16, and one or more apertures 15 at preselected positions along the shaft 12. The solution inlet connector 16 may be defined by various types of couplings including, but not limited to, threaded connectors, quick disconnect, valved connections, or others which all allow for fluid flow. The solutions inlet connector 16 may be adapted as necessary to allow the user to connect the outlet filter cleaner 10 to a hose or water line or air line or high pressure air line or any fluid, liquid or gas, source commonly used for surface cleaning or solid material dislodging. During normal use, the water or air is forced into the hollow shaft 12 through the inlet connector 16 and flows out of the shaft 12 through the apertures 15. Similar to the first embodiment, in the second embodiment an end cleaning disc 20 is affixed to the distal end 14 of the hollow shaft 12. The shaft 12 may be a one-piece shaft or may be a multi-piece shaft. Optionally, the shaft 12 may include a handle 18 attached to the proximal end 13. Further, one or more intermediate cleaning discs 30 may be affixed along the shaft 12 between the proximal and distal ends. When the shaft 12 is moved vertically by way of the handle 18, the disc 20, which may include the additional cleaning disc 30, moves vertically through the filter 50. The discs 20, 30 each have a plurality of fingers 26 which extend into the spaces 60 defined between the vertical slats 58. Accordingly, the fingers 26 clear lodged materials within the spaces.

Figure 5:
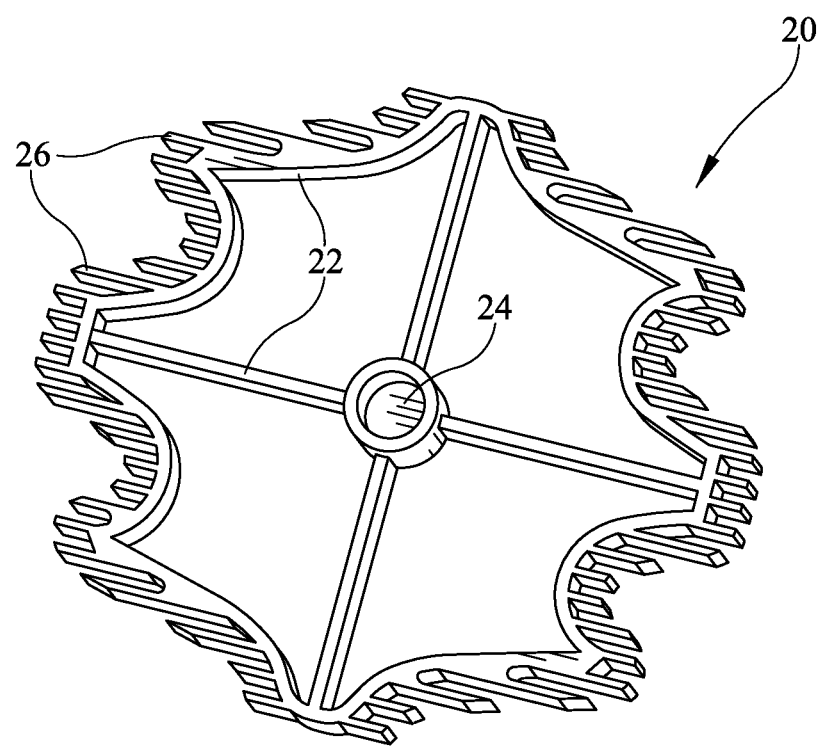
FIG. 5 is a perspective view of an example of a cleaning disc.

As shown in FIG. 5, the end cleaning disc 20 comprises a frame 22, a mounting site 24 and a plurality of fingers 26. In some embodiments, the frame 22 may be planar with a periphery that complements the cross-sectional geometry of the tubular filter element. The mounting site 24 is located at the center of the frame 22 and is used to attach the cleaning disc 20 to the central shaft 12. The disc 20 may be various shapes to cooperate with the filter shape. The mounting site 24 of the end cleaning disc may be solid so the disc does not slide along the shaft 12. Attached to and extending outwardly from the periphery of the frame 22 is a plurality of fingers or protrusions 26. The length of the fingers 26 will vary with the specific outlet filter design in which the outlet filter cleaner 10 is being used. The fingers 26 on any particular end cleaning disc 20 may all be of generally the same length or each finger 26 may differ in length from other finger 26 on the disc 20 or the fingers 26 may be arranged in symmetric patterns based on finger length or a combination thereof. When used with a tubular filter element, the fingers 26 are designed to be long enough to fit between the slats 58 (FIG. 2) of the outlet filter 50 (FIG. 2) when the cleaning disc 20 is attached to the central shaft 12 and the central shaft 12 is positioned within the tubular filter element. As the shaft 12 is raised and lowered within the tubular element, the fingers 26 engage the edges of the filter slats 58 and dislodge debris from the slats. When used with a filter disc or disc-dam filter, the finger lengths may vary. In an optional design, the finger lengths may extend to touch the inside surface of the filter disc housing thereby allowing the fingers 26 to dislodge solid material adhered to the housing surface. When used with a columnar filter array, the finger lengths may vary. In an optional design, the finger lengths may extend to touch the exterior surfaces of each of the columnar filters within a filter array thereby allowing the fingers 26 to dislodge solid material adhered to the column surfaces.

Figure 6:
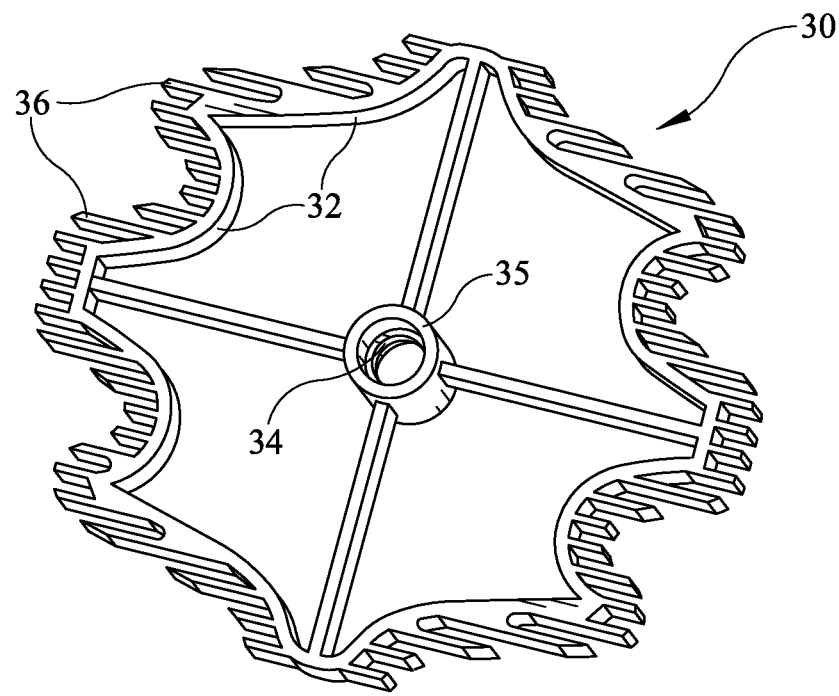
FIG. 6 is a perspective view of an example of an alternate cleaning disc.

In some embodiments, the outlet filter cleaner 10 further comprises at least one intermediate cleaning disc 30. The intermediate cleaning disc 30 may be similar to the end cleaning disc 20 except at the mounting site. Specifically, for example, the intermediate cleaning disc 30 comprises a frame 32, a center void site 34 and a plurality of fingers 36, as shown in FIG. 6. The frame 32 may be planar with a periphery that complements, or cooperates with, the cross-sectional geometry of the tubular filter element. The center void site 34 is located at the center of the frame 32 and is used to attach the cleaning disc 30 to the central shaft 12. The center void site 34 of the intermediate cleaning disc 30 is surrounded by a peripheral ring 35 that fits snuggly onto the shaft 12 so the disc 30 can be moved on the shaft 12 but does not slide freely along the shaft 12. Various other structures may be used to retain the disc 30 in a desired position, such as threads or ribs. Attached to and extending outwardly from the periphery of the frame is a plurality of fingers or protrusions 36. Similar to the fingers 26 of the end disc 20, the length of the fingers 36 will vary with the specific outlet filter design in which the outlet filter cleaner 10 is being used. The fingers 36 on any particular intermediate cleaning disc 30 may all be essentially the same length or each finger 36 may differ in length from other finger 36 on the disc 30 or the fingers 36 may be arranged in symmetric patterns based on finger length or a combination thereof, and the fingers 36 of the intermediate disc 30 function in the same manner as the fingers 26 of the end disc 20.

The outlet filter cleaner 10 may comprise one or more intermediate cleaning discs 30 in addition to one end disc 20. In some embodiments, the outlet filter cleaner 10 has an adequate number of cleaning discs 20, 30 to provide at least one finger 26, 36 per slot in the filter. In still other embodiments, the fingers are oriented in locations substantially identical to the positions of the slots in the filter. Alternatively, if the outlet filter cleaner 10 is used to clean an outlet filter that has filter discs or columnar filters, it is recommended that the outlet filter cleaner 10 has an adequate number of cleaning discs 20, 30 to allow the fingers 26, 36 to touch a sufficient percentage of the debris accumulating surfaces to effectively clean the outlet filter.

The cleaning discs 20, 30 may be made from any material or combination of materials that will allow the disc frame 22, 32 to retain its shape when the shaft 12 is moved. The fingers 26, 36 are preferably made from the same materials as the frame 22, 32, but there is no requirement that the materials be identical. However, if different materials are used, the materials must be complementary so the fingers 26, 36 are securely retained on the frame 22, 32 when the shaft 12 is moved and the fingers engage the edges of the slats 58. Further, the frame 22, 32 and its associated fingers 26, 36 may be formed as a single unitary structure or as separate pieces that are secured together.

Figure 7:
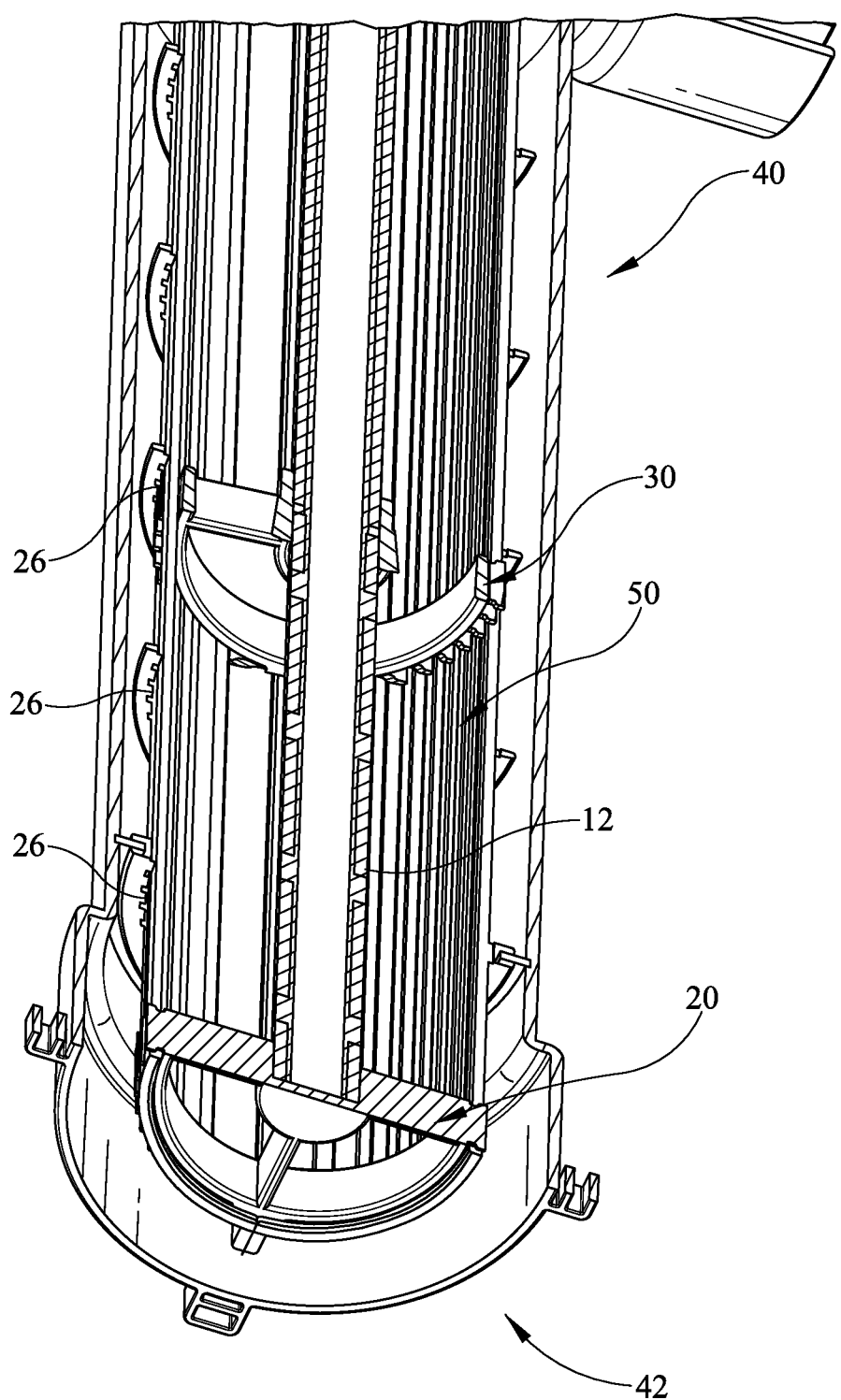
FIG. 7 is a sectioned perspective view of the outlet filter cleaner.

Referring now to FIG. 7, a lower section perspective view is depicted of the filter housing pipe 40 with a better view of the discs 20, 30. The figure depicts the fingers 26 of the discs 20, 30 which extend in an outward direction through the spaces 60 between slats 58 of the filter 50. The arrangement of vertical slats 58 and spaces or slots 60 allow for the vertical movement of the fingers 26 therebetween as the shaft 12 is moved up and down relative to the filter 50 and the filter housing pipe 40.

Figure 8:
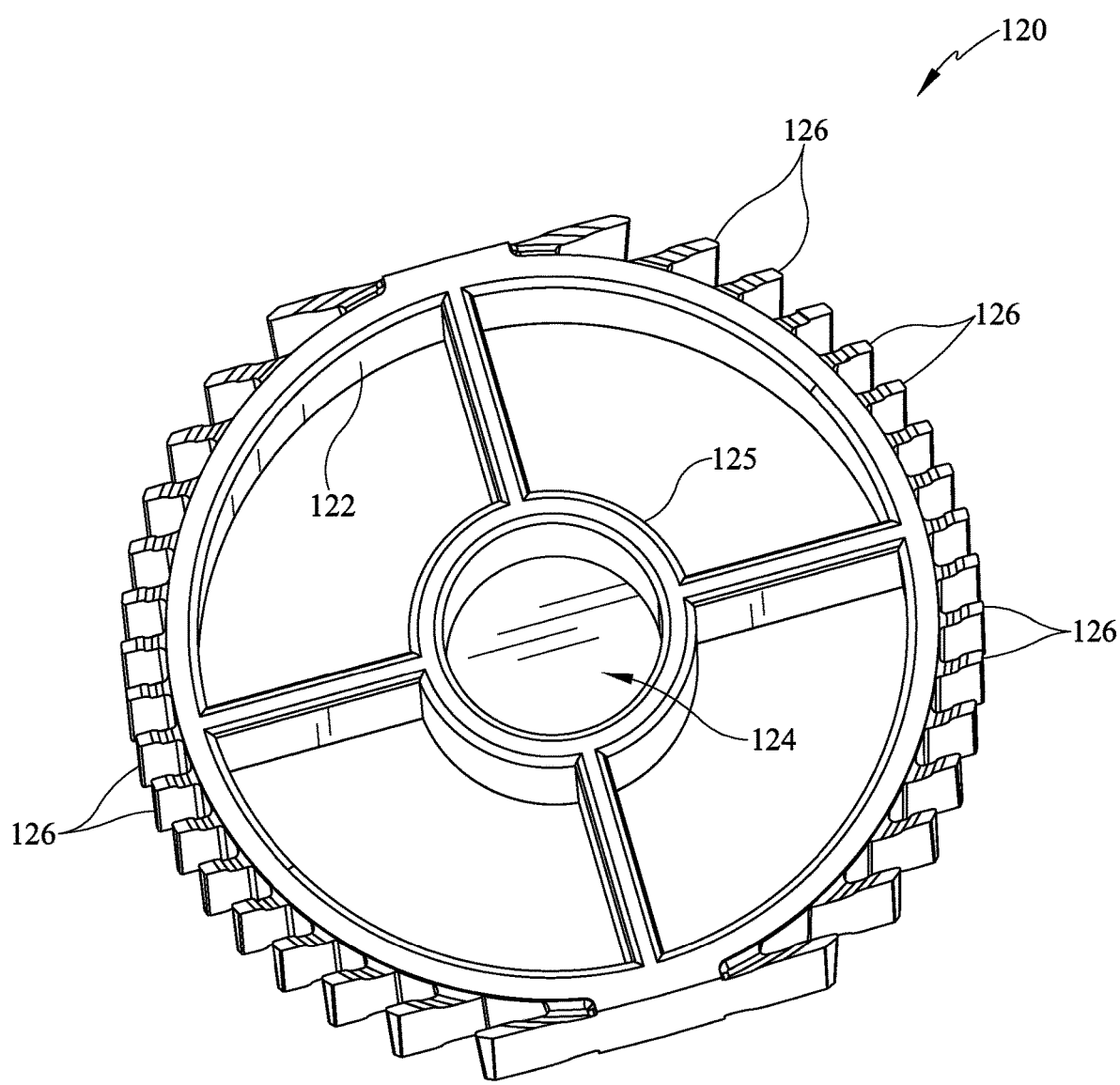
FIG. 8 is a perspective view of a further example cleaning disc.

Referring now to FIG. 8, an alternate embodiment of the discs 20, 30 is depicted. The instant disc 120 is generally circular in shape and has a plurality of fingers 126 extending outwardly from the outer surface of the disc 120. The disc 120 may have a body 122 which is circular and from which the fingers 126 extend. The fingers 126 may extend from the outer surface of the disc 120 in various manners. As shown, the fingers 126 extend in a single direction from the body 122 at the 3 O'clock and 9 O'clock positions to the body 122 and is generally tangential to the body 122 at the 12 O'clock and 6 O'clock positions. The fingers 126 also extend outwardly from the outer surface of body 122 in order to engage in the spaces 60 between slats 58. The orientation or direction that the fingers 126 extend may also vary. The fingers 126 may extend radially in other embodiments. This may be dependent upon the method of forming the discs 20, 30, 120. While the single disc 120 is depicted, similar discs may be used for the disc 120 or combinations of those depicted and/or alternate structures may be utilized. Within the inner portion of the body 122 is a central void 124 which is generally defined by a peripheral ring 125. This void 124 and ring 125 provide for positioning of the disc 120 on the shaft 12 (FIG. 4). In the case of alternate or intermediate discs, the ring 125 may be hollow so that the shaft may pass through or a ring may be formed having an upper void and a lower void where the shaft may be a two-piece shaft, one connected on both sides of the ring 125.

Figure 9:
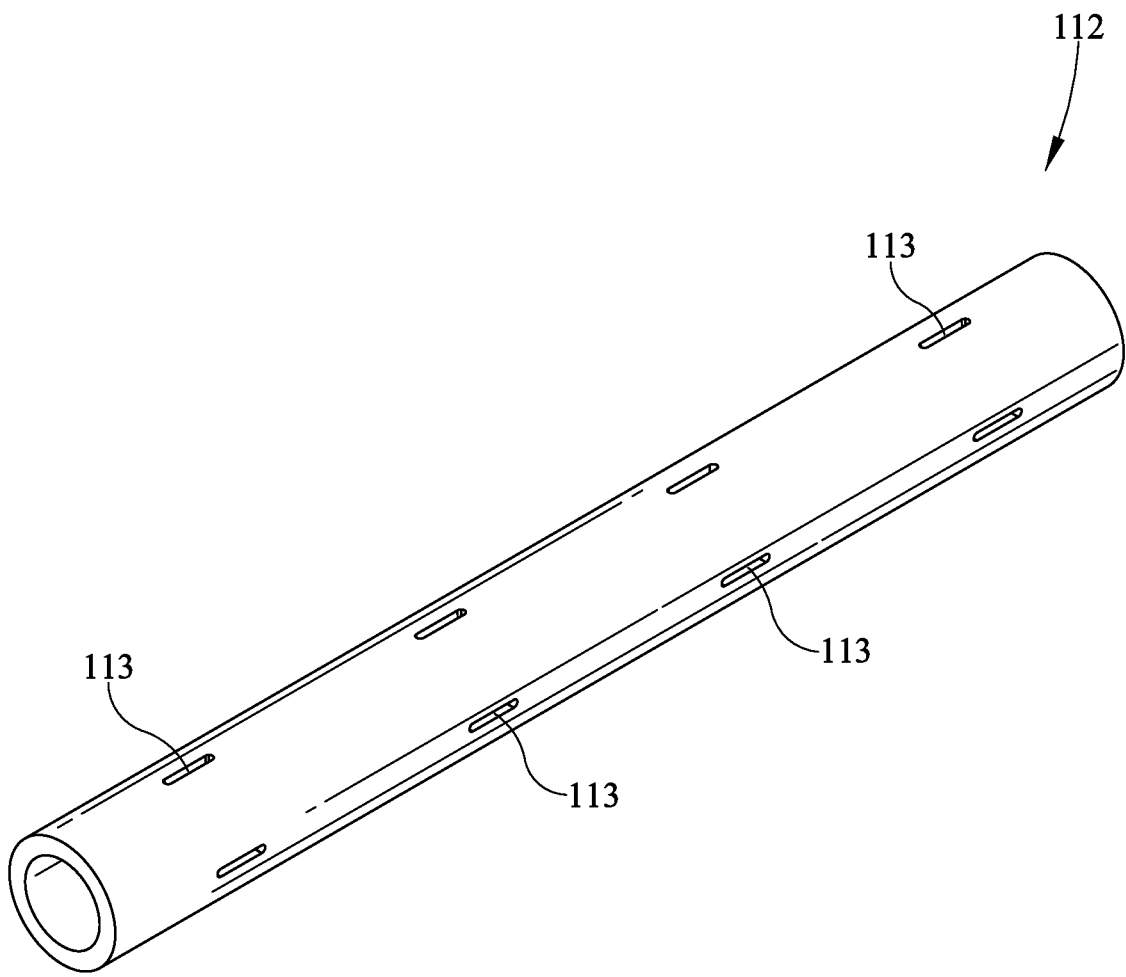
FIG. 9 is a perspective view of a shaft of the outlet filter cleaner.

Referring now to FIG. 9, an alternate embodiment of the shaft 12 is depicted. The instant shaft 112 is shown having a plurality of slots 113 spaced along the surface of the shaft 112. The shaft 112 is hollow to allow a fluid such as water or compressed air, for non-limiting example, to pass through the shaft 112. When the fluid reaches the slots 113, the fluid is directed outwardly through the shaft 112 toward the interior of the filter 50. This will cause the cleaning or agitation of the spaces 60 (FIG. 2) within the filter 50 (FIG. 2) and alone, or in combination with the fingers 26, 126 of the discs 20, 30, 120, will better clean the filter 50. As noted previously, an upper end of shaft 112 may have any of various types of connectors for fluid supply to the interior of shaft 112.

Figure 10:
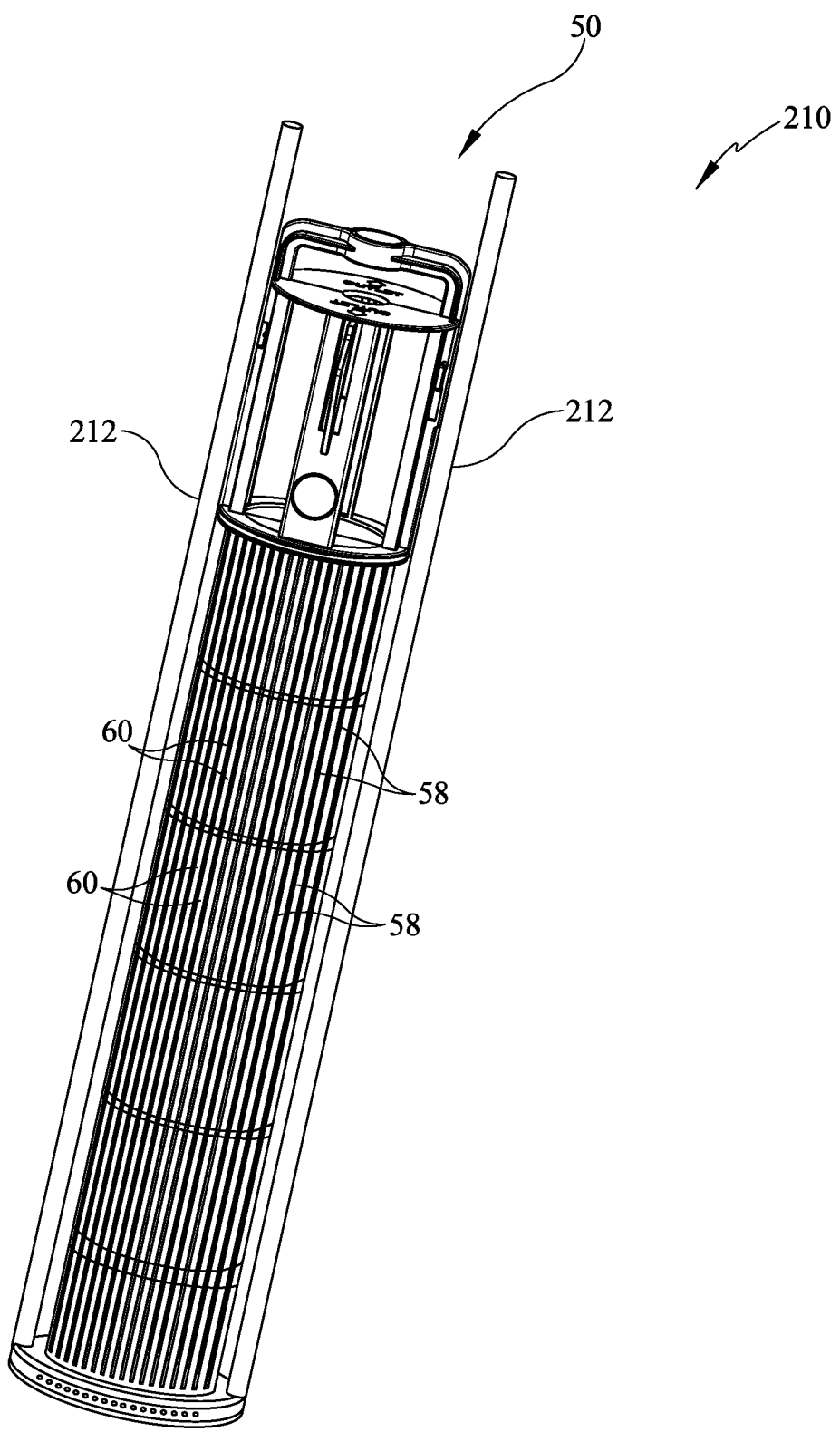
FIG. 10 is a perspective view of an outlet filter cleaner.
Figure 11:
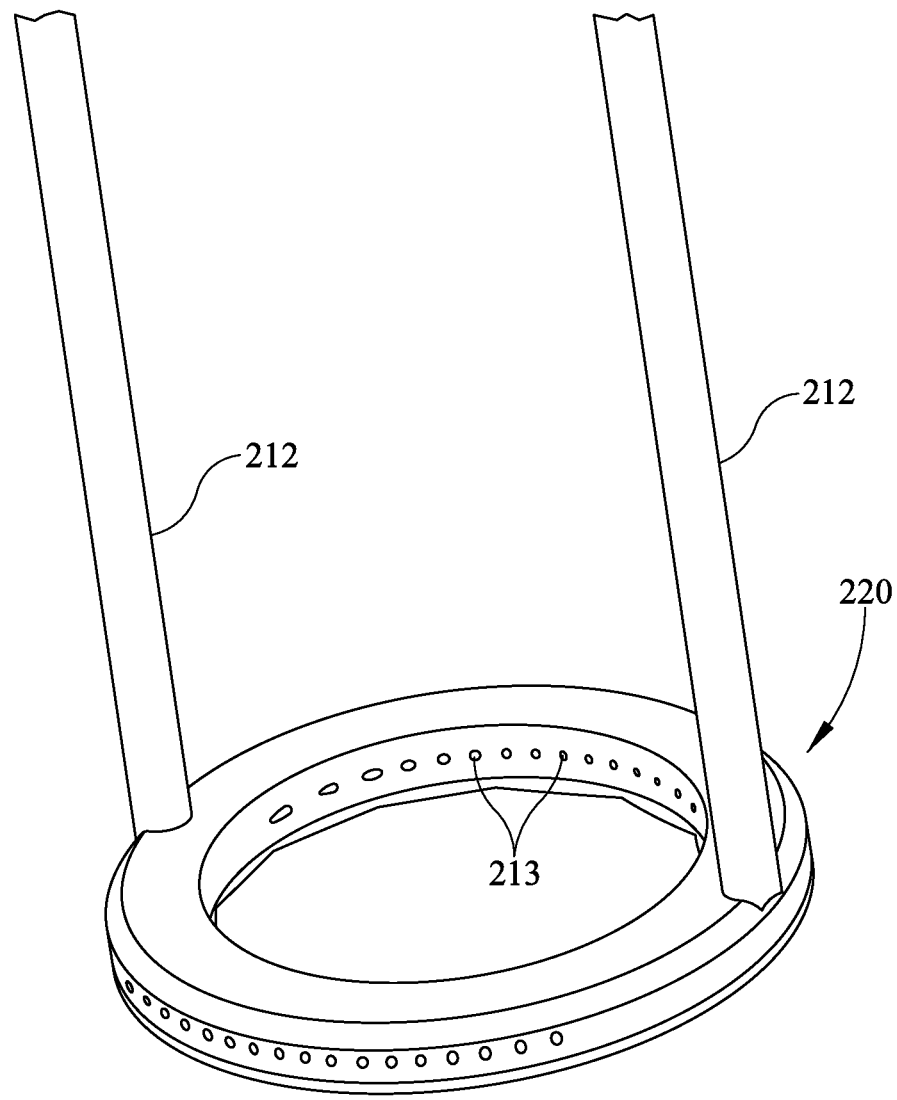
Figure 12:
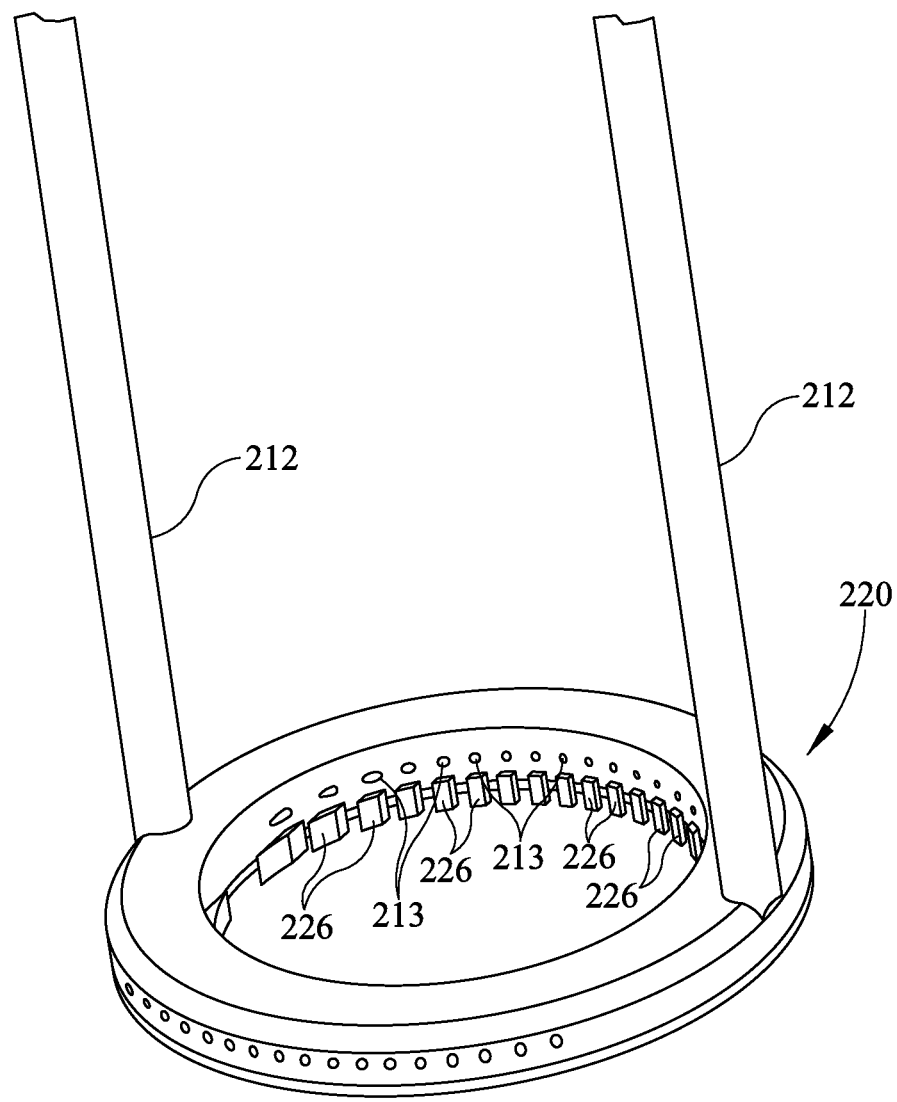
FIG. 12 is a further example of the filter cleaner of FIG. 11 including additional mechanical cleaners.

With reference now to FIGS. 10-12, an alternate embodiment of the outlet filter cleaner 210 is depicted. With reference first to FIG. 10, the filter 50 is shown with first and second shafts 212 extending in an axial direction along sides of the filter 50. In the previous embodiments, the fluid for cleaning the filter 50 was described as being delivered through the shaft 12 which extended through the filter 50 and forced the cleaning fluid in an outward direction from within the filter 50 in order to clean the spaces 60 between the slats 58. The instant embodiment provides that the cleaning fluid and/or the fingers 26, 126 of the discs 20, 30, 120 may extend from, or be directed from, an outer side of the filter 50 to an inner side. This may be desirable in order to keep the waste away from the outlet 44 of the filter housing pipe 40. The shafts 212 extend along one or more sides of the filter 150 toward a lower end. In one embodiment shown in FIG. 11, the disc 220 is generally circular to fit around the outside of the filter 150 and comprises a plurality of fluid apertures 213 along a radially inward surface thereof. The shafts 212 may be hollow to deliver the fluid to the disc 220. The disc 220 may have a plurality of apertures 213 along the radially inward facing surface so as to blow the fluid through the outer surface of the filter 50 toward the inner side. The shafts 212 also allow movement of the disc 220 upwardly and downwardly relative to the filter 50 in order to provide cleaning all along the outer surface of the filter 50. The apertures 213 may also be spaced apart to correspond to a spacing between slats 58 of the filter 50. In other words, it may be desirable to maintain the fluid apertures 213 alignment with the spaces 60 between the slats 58 of the filter 50. In some embodiments, the disc 220 may also have apertures along the outer surface of the disc 220 in order to clean the inside of the filter housing pipe 40 or alternatively, such that the embodiment of the disc 220 may be utilized on the interior surface of the filter 50 and moved vertically therethrough.

With reference now to FIG. 12, an additional embodiment is provided to the disc 220. In this embodiment, located adjacent the apertures 213 are a plurality of fingers 226. In the instant embodiment, the fingers 226 extend inwardly so as to engage the spaces 60 of the filter 50 from the outside of the filter 50 inwardly. Thus, the cleaning may occur both by either or both of a cleaning fluid such as liquid or gas, for non-limiting example, and may additionally include mechanical cleaning by way of the fingers 226 extending into the filter 50.

Figure 13:
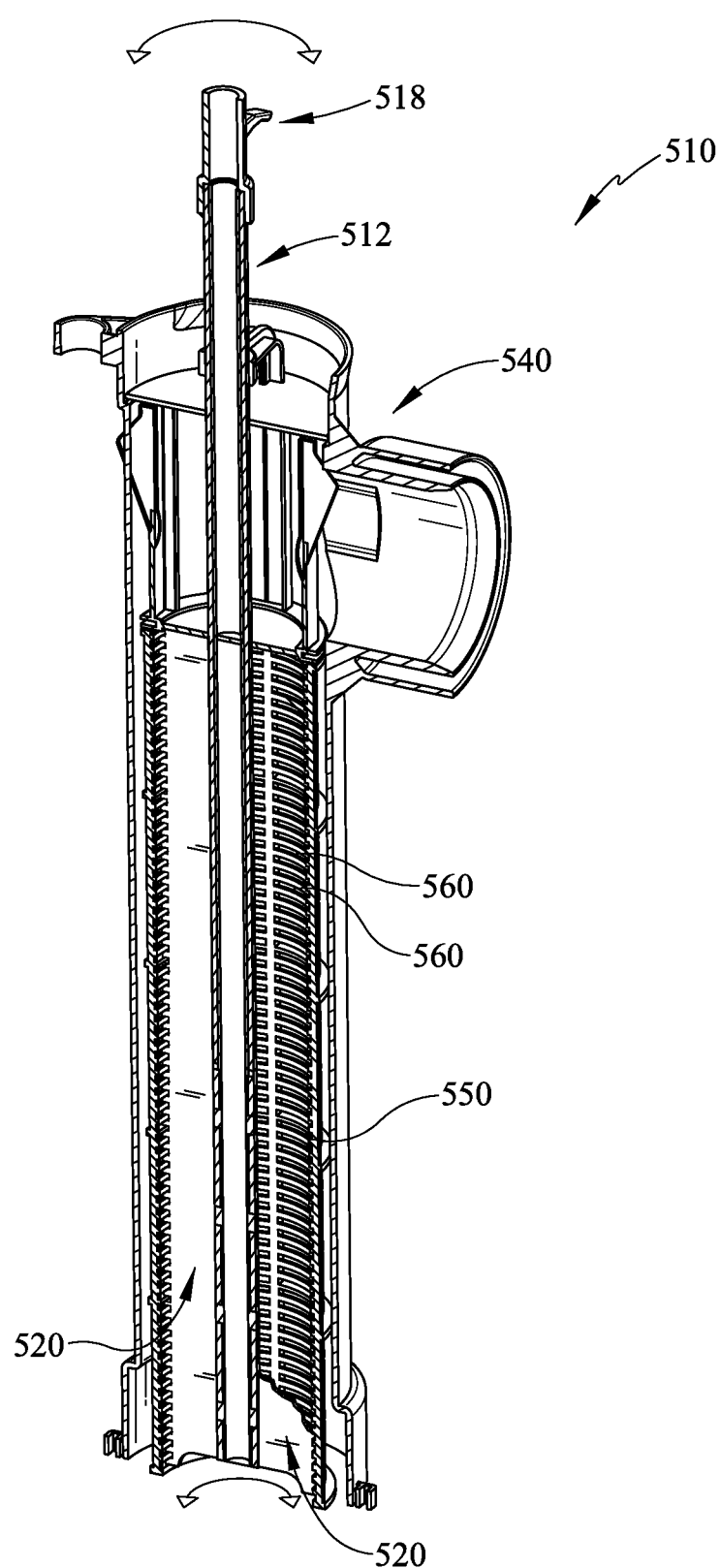
FIG. 13 is a sectioned perspective view of an alternate filter and filter cleaner.

With reference now to FIG. 13, a sectioned perspective view of an alternate filter cleaner 510 and filter 550 is shown. The filter housing pipe 40 may be the same or similar to previous embodiments such that wastewater enters at a lower inlet and exits as filtered effluent at a higher position. The filter 550 has a plurality of slots, spaces or openings 560 but instead of extending vertically as in the previous embodiment, the filter 550 has horizontal spacings 560. The spacing 560 may also be arcuate for example as in the instant embodiment where the filter 550 is circular in cross section.

The filter cleaner 510 further comprises a shaft 512 and may include a handle 518. The shaft 512 may be a solid structure or may be hollow or partially hollow for passage of a fluid, liquid or gas, to cleaning as previously described. In this embodiment, the shaft 512 and handle 518 may be rotated in order to rotate the cleaner fingers through an arcuate motion in order to clean the spaces 560. In some embodiments, the arcuate distance moved may depend on the length of the spaces 560.

The section view shows a section through a disc 520 and a partial section through a second portion of the disc 520, in order to reveal the spaces 560. Fingers 526 may extend from the ends of the disc 520. As with previous embodiments, the term disc is not meant to limit the structure to a specific shape or a single structure. The disc 520 may be one arm with fingers at the end, or may be a plurality of arms with fingers at the end. Various shapes may be used to define the disc 520.

With the rotation of the shaft 512, disc 520 and fingers 526, the spaces 560 are cleaned out. This occurs however, without need to remove the filter from the septic system. In other embodiments, the spaces or spacings may be spiral in nature and the shaft movement may be both rotational and vertical.

Figure 14:
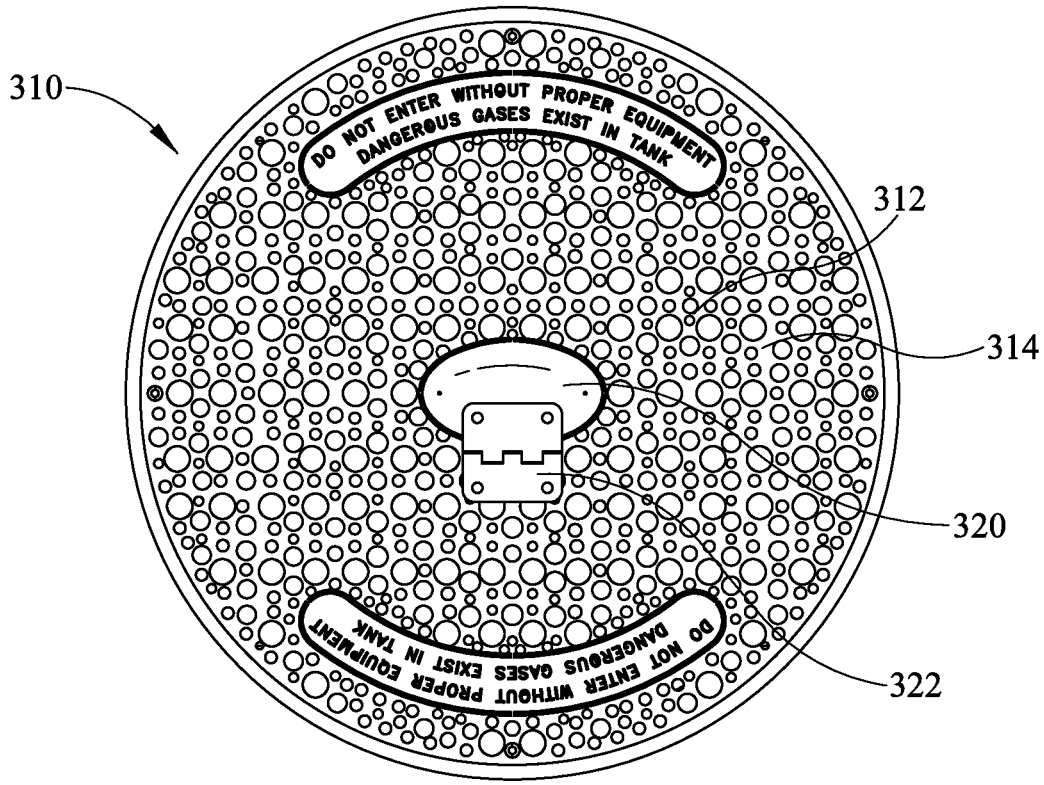
FIG. 14 is a top perspective view of a first embodiment of the riser cover of the system invention wherein the cover is shown with the access door closed.
Figure 15:
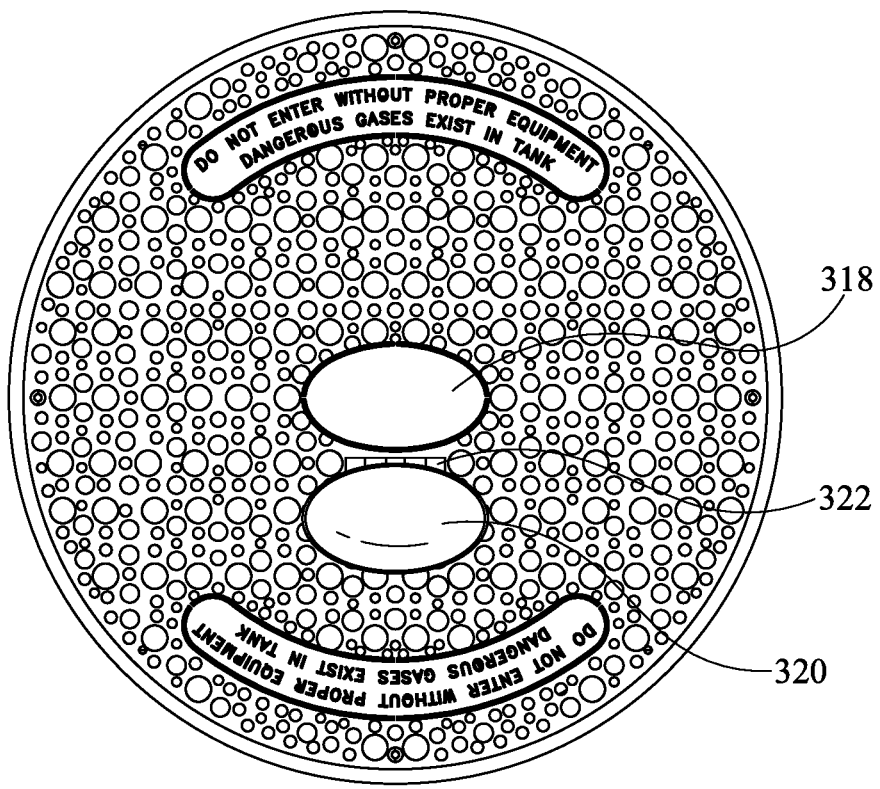
FIG. 15 is a top perspective view of the cover of FIG. 14 wherein the cover is shown with the access door opened.

Referring now to FIGS. 14 and 15, the cover 310 is a plate 312 defining a top surface 314 and a bottom surface 316 (not shown) having an aperture 318 covered by a flap 320 affixed to the plate by a hinge 322. The aperture 318 extending through the plate 312 from the top surface 314 to the bottom surface 316. The aperture 318 may be any shape, such as without limitation, circular, oval, square or rectangular. In one embodiment, the aperture 318 may be centered on the cover 310. In a second embodiment, the aperture 318 is positioned off-center on the cover 310. Further, while the plate 312 is shown as substantially circular, the plate 312 may be other shapes as well, depending on the shape of the riser.

The flap 320 may be proportioned to completely cover the aperture 318 may be fixedly attached to the top surface 314 of the plate 312 such that the flap 320 can be easily opened or closed without removing the cover 310 from the riser. The flap 320 must be sized to at least completely cover the aperture 318 to prevent materials from the environment to enter the septic tank through the aperture 318. Optionally, the flap 320 may be larger than the aperture 318. The hinge 322 attaches the flap 320 to the plate 312. An exemplary means for attachment of the flap 320 to the plate 312 is a winged hinge 322, as shown in FIGS. 14 and 15. Alternatively, any hinge known in the art that will allow the flap 320 to be opened and closed may be used. In some examples, the flap may be removable such as by threads or knuckles or for example, by friction fit on the flap 320 that allow the flap 320 to be secured within the aperture 318 by twisting. The flap 320 and hinge 322 may be positioned on the plate 312 such that no part of the aperture 18 is exposed to the environment when the flap 320 is closed. In other embodiments, the flap 320 may be removably connected to cover 310. For example, the flap 320 may be a twist and lock, push and turn, or may be a threaded flap which engages threads in the cover 310.

In some embodiments, the cover 310 is circular, but it can be of another shape that corresponds to the shape of the riser to be covered. Exemplary materials for manufacture of the cover 310 include high density polyethylene or other rigid polymeric material.

The septic tank cover 310 has an area of about 110 square inches to about 700 square inches (corresponds to a diameter of between about 12 inches to about 30 inches). The aperture 318 preferably has an area of about 12.5 square inches or a diameter of about 4 inches. To minimize the risk of small animals falling into the septic tank through the aperture 318, the aperture 318 may, in some embodiments, have a maximum area of about 30 square inches or a diameter of about 6 inches. These dimensions are merely for the purpose of demonstrating the invention and are subject to molding or manufacturing tolerances. The aperture 318 should allow for a user's hand to pass through to grasp the handle of the filter cleaner.

Figure 16:
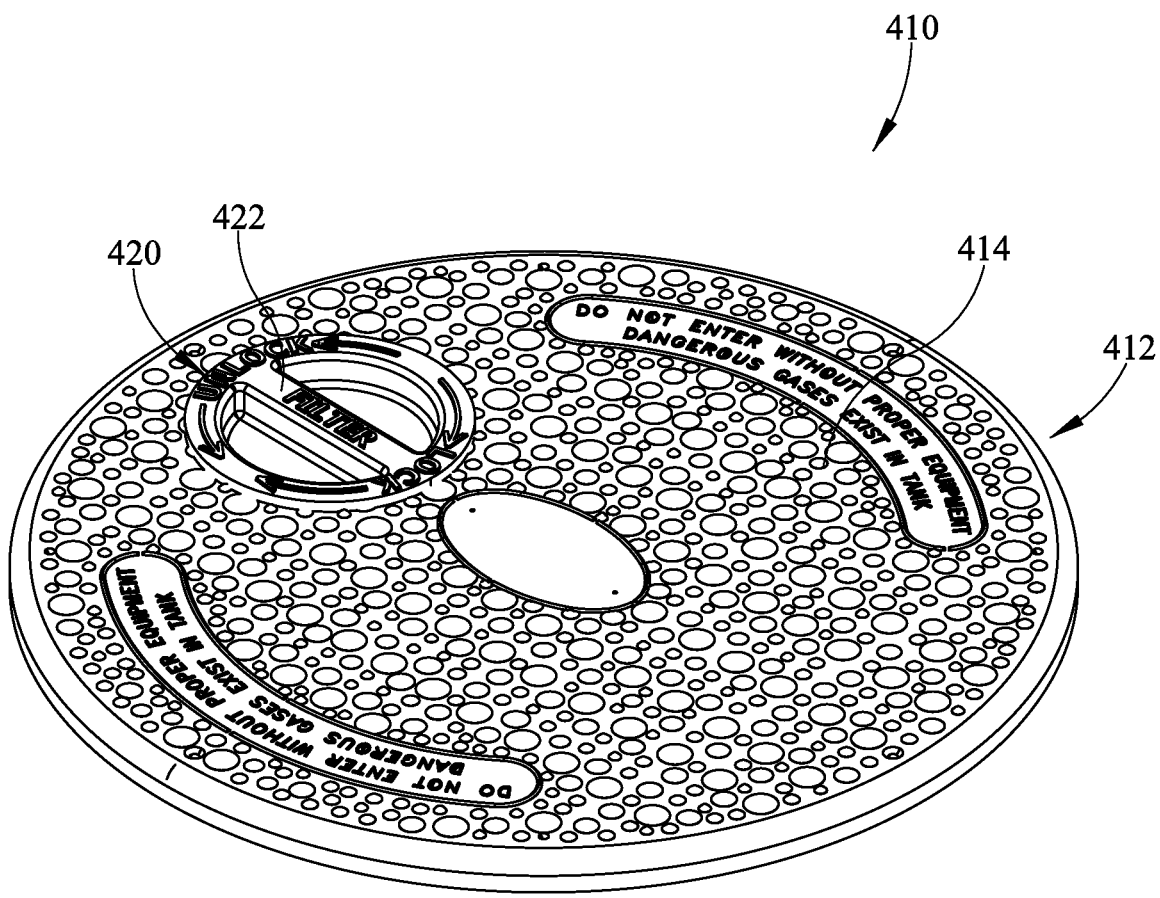
FIG. 16 is a perspective view an example embodiment of a cover.
Figure 17:
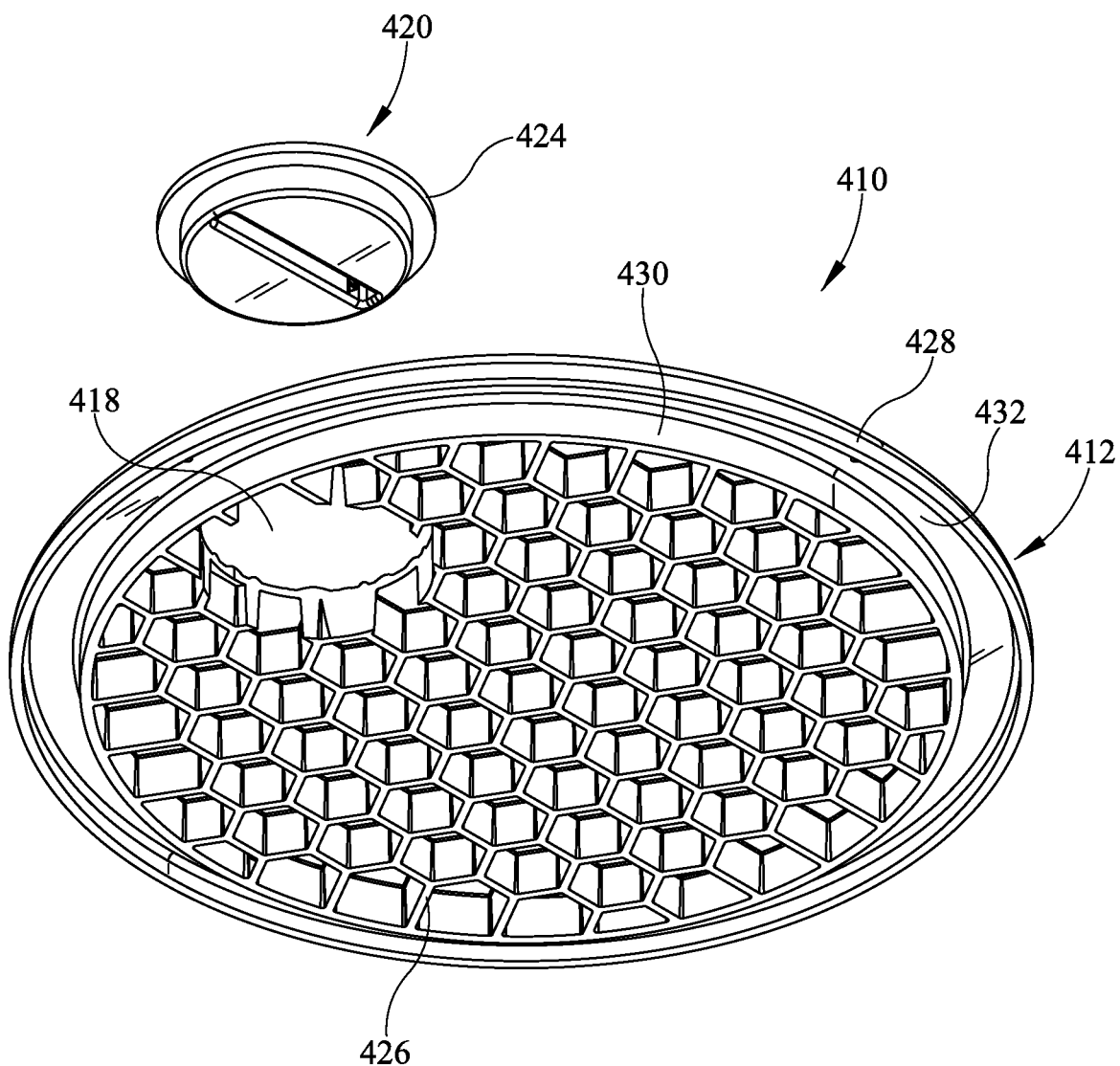
FIG. 17 is a lower perspective view of the example embodiment of a cover of FIG. 16.

With reference now to FIGS. 16 and 17, a further embodiment of the cover 410 is depicted. In the perspective view of FIG. 26, the cover 410 is shown having a flap 420 which may be removed from an aperture 418 (FIG. 17) in the cover 410. The flap 420 is any structure which may cover the aperture 418 defined in the plate 412. In the instant embodiment, the flap 420 is generally circular in shape and includes a rib 422 which bisects the circular shape. The rib 422 allows a location and structure to grasp the flap 420 and rotate the part in order to rotate in or rotate out of the plate 412. Further, as shown in the view, the rib 422 may allow for locking and unlocking of the flap 420.

The flap 420 is positioned off-center in the depicted embodiment, but may also be centered relative to the plate 412. The flap 420 and aperture 418 of the plate 412 are also disposed above the handle 18 (FIG. 1) of the filter cleaner 10 (FIG. 1). Accordingly, when the flap 420 is removed, the handle 18 is located below the flap 420 so that a user may easily grasp the handle 18 in order to move such and clean the filter 50. Thus, the instant embodiment allows for ease of cleaning without the need to remove the cover 410.

The upper surface 414 of the cover 410 may have a plurality of protuberances to provide additional friction to the upper surface 414. Likewise, the protuberances may also provide the plate 412 with different feel than the adjacent ground surrounding the cover 410.

Referring additionally to FIG. 17, a lower perspective view of the cover 410 is depicted with the flap 420 shown exploded from the aperture 418. The cover 410 may be formed of a lightweight material, and may be a plastic material as previously described. Accordingly, is may be desirable to provide some strength and rigidity by way of a plurality of strengthening structures. In some embodiments, this may be a honeycomb shape defined by a plurality of strengthening ribs.

Also shown exploded from the plate 412 is the flap 420. The flap 420 fits in the aperture 418 and may have a lip 424 that extends over a peripheral edge of the aperture 418. The aperture 418 is shown cut through the upper surface 414 of the plate 412 and through the honeycomb ribs of the lower surface 426.

The outer periphery of the cover 410 may have an outer peripheral rib 428 and an inner peripheral rib 430. A groove 432 is defined between the outer and inner peripheral ribs 428, 430. The outer and inner peripheral ribs 428, 430 may be sized to receive an edge of the riser upon which the cover 410 may be positioned.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An outlet filter cleaner, comprising:
   a filter housing pipe having a lower inlet and an upper outlet, located above the lower inlet;
   a filter disposed within the filter housing pipe, said filter having a plurality of vertically extending filtration slats that define a plurality of vertically extending spacings;
   a plurality of axially spaced circumferential ribs disposed about an exterior of said filter;
   a disc disposed in the filter;
   a hollow shaft connected to the disc, said disc being movable with said hollow shaft through said filter;
   a plurality of fingers of predetermined length extending from said disc and extending into the plurality of vertically extending spacings;
   said plurality of fingers being movable through the plurality of vertically extending spacings with movement of the hollow shaft and the disc through the filter, said plurality of fingers being capable of passing by said plurality of axially spaced circumferential ribs during said movement.

2. The outlet filter cleaner of claim 1, said hollow shaft having a handle at an upper end.

3. The outlet filter cleaner of claim 1, said hollow shaft having a plurality of openings therein for movement of fluid.

4. The outlet filter cleaner of claim 3 further comprising a coupling at an upper end of the hollow shaft to provide a connection with a fluid supply.

5. The outlet filter cleaner of claim 4 further comprising movement of the fluid supply through the filter.

6. The outlet filter cleaner of claim 1 further comprising a second disc on the hollow shaft.

7. The outlet filter cleaner of claim 1 further comprising said filter housing pipe having an outlet pipe.

8. The outlet filter cleaner of claim 1 wherein the hollow shaft moves vertically, rotates, or a combination of both.

9. An outlet filter cleaner, comprising:
a filter housing pipe having a lower inlet and an upper outlet, wherein waste fluid moves into the lower inlet and out through the upper outlet;
a filter disposed within said filter housing pipe, said filter having a plurality of vertical slats defining vertical spaces therebetween;
a plurality of circumferential ribs spaced apart axially along said filter;
a hollow shaft disposed in the filter and having at least one disc connected to the hollow shaft, said at least one disc having a plurality of fingers extending through the vertical spaces, said plurality of circumferential ribs allowing passage of said plurality of fingers;
the hollow shaft having a plurality of apertures in flow communication with an interior of the hollow shaft and capable of directing a fluid from within said hollow shaft toward said filter;
the hollow shaft having a manually actuable handle to move the hollow shaft and the at least one disc relative to the filter and move the plurality of fingers through the vertical spaces to clean the filter.

10. The outlet filter cleaner of claim 9, said filter being sealed relative to an inner surface of the filter housing pipe.

11. The outlet filter cleaner of claim 9, further comprising a handle on said hollow shaft.

12. The outlet filter cleaner of claim 9, further comprising a coupling for connection of a fluid conduit.

13. The outlet filter cleaner of claim 12 wherein a fluid from said fluid conduit is capable of moving through the filter.

14. The outlet filter cleaner of claim 9 wherein the hollow shaft moves vertically, rotates, or a combination of both.

15. An outlet filter cleaner, comprising:
a housing pipe having a lower inlet and an outlet located above said lower inlet;
a filter having a plurality of filtration slats which define a plurality of spacings;
a plurality of circumferential ribs spaced apart axially located along an exterior of said filter;
a disc disposed adjacent to the filter;
a hollow shaft connected to the disc, said disc being movable by a handle near an end of the hollow shaft with said hollow shaft relative said filter, said hollow shaft having an inlet connector configured to connect to a fluid supply;
a plurality of apertures disposed in said hollow shaft to direct said fluid supply from within the hollow shaft toward the filter;
a plurality of fingers of predetermined length extending from said disc and extending into the plurality of spacings;
said plurality of fingers being movable through the plurality of spacings and passing by the plurality of circumferential ribs with movement of the disc relative to the filter.

16. The outlet filter cleaner of claim 15, wherein the disc being disposed within the filter.

17. The outlet filter cleaner of claim 16, wherein said plurality of fingers are extending outwardly.

18. The outlet filter cleaner of claim 17, said plurality of apertures for directing a fluid from said fluid supply through the filter.

19. A method of cleaning a filter for a septic system, comprising:
providing a filter housing pipe within a septic tank of said septic system, said filter housing pipe having a lower inlet and an upper outlet wherein waste fluid is capable of movement into the lower inlet and out through the upper outlet;
providing said filter having a plurality of vertical slats defining a plurality of vertical spaces within said filter housing pipe, said filter also having a plurality of circumferential ribs spaced apart axially, and a hollow shaft disposed in the filter and having at least one disc connected to the hollow shaft, said at least one disc having a plurality of fingers extending through the vertical spaces, said plurality of circumferential ribs allowing passage of said plurality of fingers, the hollow shaft having a plurality of apertures in flow communication with an interior of the hollow shaft and capable of directing a fluid from within said hollow shaft toward the filter, the hollow shaft having a manually actuable handle to move the hollow shaft and the at least one disc relative to the filter;
moving the at least one disc through said filter, and moving said plurality of fingers extending through said vertical spaces.

20. The method of claim 19 further comprising forcing said fluid through said hollow shaft connected to the at least one disc to clean said vertical spaces.

21. The method of claim 19 further comprising moving said waste fluid from an inside to an outside of the filter.

* * * * *